(12) United States Patent
Palmer et al.

(10) Patent No.: US 8,209,061 B2
(45) Date of Patent: Jun. 26, 2012

(54) COMPUTER-OPERATED LANDSCAPE IRRIGATION AND LIGHTING SYSTEM

(75) Inventors: Doug Palmer, Redlands, CA (US); Alex Korol, Diamond Bar, CA (US)

(73) Assignee: The Toro Company, Bloomington, MN (US)

( * ) Notice: Subject to any disclaimer, the term of this patent is extended or adjusted under 35 U.S.C. 154(b) by 4 days.

(21) Appl. No.: 12/091,272

(22) PCT Filed: Jul. 31, 2006
(Under 37 CFR 1.47)

(86) PCT No.: PCT/US2006/029947
§ 371 (c)(1),
(2), (4) Date: Jan. 12, 2009

(87) PCT Pub. No.: WO2007/050175
PCT Pub. Date: May 3, 2007

(65) Prior Publication Data
US 2010/0030389 A1   Feb. 4, 2010

Related U.S. Application Data

(60) Provisional application No. 60/729,612, filed on Oct. 24, 2005.

(51) Int. Cl.
| | | |
|---|---|---|
| G05B 19/18 | (2006.01) |
| G05B 11/01 | (2006.01) |
| G05D 11/00 | (2006.01) |
| G08B 23/00 | (2006.01) |
| G09G 5/00 | (2006.01) |
| A24F 25/00 | (2006.01) |
| B05B 3/08 | (2006.01) |
| B05B 3/18 | (2006.01) |

(52) U.S. Cl. .......... 700/284; 239/47; 239/236; 239/723; 340/517; 345/1.1; 345/2.1; 700/3; 700/9; 700/17; 700/19

(58) Field of Classification Search .................. 700/284, 700/17, 3, 9, 19; 239/47, 236, 723; 172/64; 345/1.1, 2.1; 340/517, 571
See application file for complete search history.

(56) References Cited

U.S. PATENT DOCUMENTS
4,165,532 A   8/1979 Kendall et al.
(Continued)

OTHER PUBLICATIONS

Smart-J.A., "The Livermore Security Console System", 1987, CONF-870743-5 Journal Announcement: GRAI8724; NSA 12, 7 pages.*

(Continued)

*Primary Examiner* — Albert Decady
*Assistant Examiner* — Thomas Stevens
(74) *Attorney, Agent, or Firm* — Inskeep IP Group, Inc,

(57) ABSTRACT

A multi-zone landscape irrigation and lighting system includes a personal computer equipped with a detachable wireless remote, and a multi-station controller operating a plurality of irrigation valves and lighting circuits in accordance with schedules wirelessly transmitted to it by the computer through the remote. When detached from the computer, the remote can wirelessly operate selected irrigation or lighting zones manually. The computer has an intuitive graphic user interface capable of using actual zone photographs to identify individual zones in a strip of zone icons. The icon strip is movable past a lens-like window, the zone icon under the lens at a given time determining the zone currently programmable. A residential system can be operated by a contractor from the street, and the system can be programmed by e-mail from the contractor's shop. Fully automatic operation may be derived from data obtained over the Internet.

19 Claims, 12 Drawing Sheets

U.S. PATENT DOCUMENTS

| | | | | |
|---|---|---|---|---|
| 4,209,131 | A | 6/1980 | Barash et al. | |
| 4,244,022 | A | 1/1981 | Kendall | |
| 4,304,989 | A | 12/1981 | Vos et al. | |
| 4,569,020 | A | 2/1986 | Snoddy et al. | |
| 4,626,984 | A | 12/1986 | Unruh et al. | |
| 4,646,224 | A | 2/1987 | Ransburg et al. | |
| 4,827,155 | A | 5/1989 | Firebaugh | |
| 4,852,051 | A | 7/1989 | Mylne, III | |
| 5,038,268 | A | 8/1991 | Krause et al. | |
| 5,124,942 | A * | 6/1992 | Nielsen et al. | 715/713 |
| 5,187,797 | A * | 2/1993 | Nielsen et al. | |
| 5,251,153 | A | 10/1993 | Nielsen et al. | |
| 5,278,749 | A | 1/1994 | De Man | |
| 5,331,619 | A | 7/1994 | Barnum et al. | |
| 5,363,290 | A | 11/1994 | Doup et al. | |
| 5,400,246 | A * | 3/1995 | Wilson et al. | 700/17 |
| 5,444,611 | A | 8/1995 | Woytowitz et al. | |
| 5,458,048 | A | 10/1995 | Hohner | |
| 5,479,339 | A * | 12/1995 | Miller | 700/16 |
| 5,696,671 | A * | 12/1997 | Oliver | 700/284 |
| 5,742,500 | A | 4/1998 | Irvin | |
| 5,746,250 | A | 5/1998 | Wick | |
| 5,748,466 | A * | 5/1998 | McGivern et al. | 700/17 |
| 5,850,352 | A * | 12/1998 | Moezzi et al. | 345/419 |
| 5,921,280 | A | 7/1999 | Ericksen et al. | |
| 5,956,248 | A | 9/1999 | Williams et al. | |
| 6,073,110 | A | 6/2000 | Rhodes et al. | |
| 6,076,740 | A | 6/2000 | Townsend | |
| 6,098,898 | A | 8/2000 | Storch | |
| 6,102,061 | A | 8/2000 | Addink | |
| 6,259,970 | B1 | 7/2001 | Brundisini | |
| 6,298,285 | B1 | 10/2001 | Addink et al. | |
| 6,313,852 | B1 | 11/2001 | Ishizaki et al. | |
| 6,453,216 | B1 * | 9/2002 | McCabe et al. | 700/284 |
| 6,490,505 | B1 | 12/2002 | Simon et al. | |
| 6,535,771 | B1 | 3/2003 | Kussel | |
| 6,694,195 | B1 | 2/2004 | Garcia | |
| 6,823,239 | B2 | 11/2004 | Sieminski | |
| 6,850,819 | B1 | 2/2005 | Townsend | |
| 6,950,728 | B1 | 9/2005 | Addink et al. | |
| 7,010,395 | B1 * | 3/2006 | Goldberg et al. | 700/284 |
| 7,010,396 | B2 * | 3/2006 | Ware et al. | 700/284 |
| 7,058,479 | B2 * | 6/2006 | Miller | 700/284 |
| 7,123,993 | B1 | 10/2006 | Freeman et al. | |
| 7,133,749 | B2 * | 11/2006 | Goldberg et al. | 700/284 |
| 7,280,892 | B2 * | 10/2007 | Bavel | 700/284 |
| 7,353,113 | B2 * | 4/2008 | Sprague et al. | 702/2 |
| 7,613,546 | B2 * | 11/2009 | Nelson et al. | 700/284 |
| 7,640,079 | B2 * | 12/2009 | Nickerson et al. | 700/284 |
| 7,844,367 | B2 * | 11/2010 | Nickerson et al. | 700/284 |
| 2002/0002425 | A1 * | 1/2002 | Dossey et al. | 700/284 |
| 2002/0010516 | A1 * | 1/2002 | Addink et al. | 700/19 |
| 2002/0014539 | A1 * | 2/2002 | Pagano et al. | 239/1 |
| 2002/0059005 | A1 | 5/2002 | Sarver | |
| 2002/0075199 | A1 * | 6/2002 | Asahi et al. | 345/1.1 |
| 2002/0130818 | A1 * | 9/2002 | Viertl | 345/1.1 |
| 2002/0166898 | A1 * | 11/2002 | Buhler et al. | 239/11 |
| 2003/0001880 | A1 * | 1/2003 | Holtz et al. | 345/716 |
| 2003/0169289 | A1 | 9/2003 | Holt et al. | |
| 2003/0179102 | A1 * | 9/2003 | Barnes | 340/870.07 |
| 2003/0182022 | A1 | 9/2003 | Addink et al. | |
| 2004/0015270 | A1 | 1/2004 | Addink et al. | |
| 2004/0039934 | A1 * | 2/2004 | Land et al. | 713/200 |
| 2004/0143602 | A1 * | 7/2004 | Ruiz et al. | 707/104.1 |
| 2004/0181315 | A1 * | 9/2004 | Cardinal et al. | 700/284 |
| 2004/0212679 | A1 * | 10/2004 | Jun | 348/159 |
| 2004/0233983 | A1 * | 11/2004 | Crawford et al. | 375/240.01 |
| 2004/0236443 | A1 * | 11/2004 | Ware et al. | 700/90 |
| 2005/0064875 | A1 * | 3/2005 | Gonsalves et al. | 455/454 |
| 2005/0121536 | A1 * | 6/2005 | Bavel | 239/69 |
| 2005/0154498 | A1 | 7/2005 | Townsend | |
| 2005/0210101 | A1 * | 9/2005 | Janik | 709/203 |
| 2005/0216302 | A1 * | 9/2005 | Raji et al. | 705/1 |
| 2006/0122735 | A1 * | 6/2006 | Goldberg et al. | 700/284 |
| 2006/0123053 | A1 * | 6/2006 | Scannell | 707/104.1 |
| 2006/0158438 | A1 * | 7/2006 | Hunter | 345/173 |

OTHER PUBLICATIONS

Sirbu et al., "A Scheduling Expert Advisor for Heterogeneous Environments", 1997, IEEE, p. 74-82.*

Goerge et al., "Development and Testing of an Irrigation Scheduling Model", 2000, Elsevier, p. 121-136.*

* cited by examiner

COMPUTER-OPERATED LANDSCAPE IRRIGATION AND LIGHTING SYSTEM

RELATED APPLICATIONS

This application claims priority to International Patent Application No. PCT/US2006/029947 filed 31 Jul. 2006 entitled Computer-Operated Landscape Irrigation And Lighting System, which in turn claims priority from U.S. Provisional Application Ser. No. 60/729,612 filed Oct. 24, 2005 entitled Method And Apparatus For Establishing An Irrigation Scheme, both of which are hereby incorporated by reference.

FIELD OF THE INVENTION

This invention relates to personal computer (PC) operated irrigation control and lighting systems, and more particularly to a combined irrigation and lighting system using at least one PC with a detachable radio transceiver to operate at least one multi-zone, multi-mode remote controller unit through the use of an intuitive zone-driven graphic user interface allowing user-selected, semi-automatic, or fully automatic irrigation scheduling.

BACKGROUND OF THE INVENTION

There is a substantial market in the landscape irrigation industry for residential and commercial irrigation control systems that can individually water a number of zones on a property that have different watering requirements in accordance with location, soil composition, exposure, vegetation and seasonal climatological factors. Homeowners or other users with such a property tend to be more or less computer-literate and are likely to own one or more computers. Because the multitude of initial settings and seasonal adjustments required for the proper operation of even a relatively small number of zones with different watering requirements on a specific property can be daunting, it is desirable to provide the user with a computer program that calculates a watering schedule for the user.

Taking into account the fact that some users like to frequently fine-tune their irrigation system while others do not want to ever be bothered with it, it is desirable to give the user the choice of any degree of control between fully automatic adjustment in accordance with forecast or existing weather conditions, or fully manual adjustment of any system parameters in accordance with personal judgment. Thus, the use of the PC for controlling the system should be sufficiently intuitive to minimize errors in complex set-ups, and to allow a do-it-yourself user to operate the system without memorizing seldom-used routines. On the other hand, the system should accommodate a disinterested user by automatically updating the system and allowing a landscaping contractor to periodically monitor and adjust the system without entering the property.

It has also been believed in the past that automatically adjustable irrigation control systems are impractical for controlling landscape illumination because the parameters that enter into automatic irrigation control are not compatible with the parameters that typically govern lighting. Yet it would be economically and practically desirable for the user to have a single, uniformly operated device that can control both irrigation and lighting.

OBJECTS AND SUMMARY OF THE INVENTION

The PC control of this invention accomplishes the above-described desired functionality by providing a portable remote control which normally plugs into a universal serial bus (USB) or serial port of the user's PC, and which communicates by radio with one or more controllers located on the property. The controllers in turn operate water valves, pumps and/or lighting relays for landscape and lighting zones in their vicinity. Operational schedules established by the inventive software running on the computer are uploaded into the controllers by passing through the remote. The controllers are identifiable as a group, and individually within the group, by codes that prevent interference from a neighbor's system, yet allow an authorized service technician to reprogram the controllers with the technician's remote without entering the homeowner's property or using the homeowner's computer. The codes allow the addition or removal of controllers or zones at any time.

In addition to transmitting schedules to the controllers, the remote can also (at the computer's command) interrogate the controllers and download their schedules onto the computer. Furthermore, the remote can, when separated from the PC, manually turn any zone on or off, so that the zone's proper operation can be checked on a walk-through of the property.

Scheduling errors in the complex systems made possible by this invention are minimized by a novel intuitive, zone-oriented graphic interface displayed on the computer. The interface consists of a graphic for each zone with a set of selectable subscreens on which schedule and zone parameters can be established. In one novel error-reducing aspect of the invention, the graphic is so arranged that a zone can be selected not only by its number and name, but by an actual photograph of the zone currently being programmed.

Each zone graphic allows the user to change the zone's runtimes by a selected common percentage for fine-tuning purposes. Each zone can also be designated as an irrigation zone (subject to automatic adjustments) or a lighting zone (whose start times and runtimes can be automatically changed in accordance with sunrise and sunset times).

To accommodate semi-automatic or fully automatic, unsupervised operation, the inventive system may be equipped with an overridable Scheduling Advisor™ capability that uses weather forecasts and zone parameter information to compute the water needs of each zone for an upcoming period of days. The Scheduling Advisor™ then adjusts the zone's watering schedules accordingly. On rainy days, a rain sensor may adjust or override watering schedules as needed.

The current watering or lighting schedule for all zones, the zones' individual parameters and the system's global settings are stored in the computer as a file. Because files can be transmitted via e-mail or by other electronic means, the invention allows the user to e-mail the current schedule to a landscape contractor to diagnose and/or repair any software problems in the shop without making a service call. A corrected file can then be e-mailed to the homeowner and downloaded onto the computer. Because each schedule is a separate, storable and accessible data structure in one file, a user is always able to recapture the contractor's initial installation schedule if he or she loses track of modifications. Alternatively, the homeowner can instantly recall any number of previously established complex schedules as climatological or other circumstances change from time to time.

DETAILED DESCRIPTION OF THE INVENTION

A. The System

Figure 1:
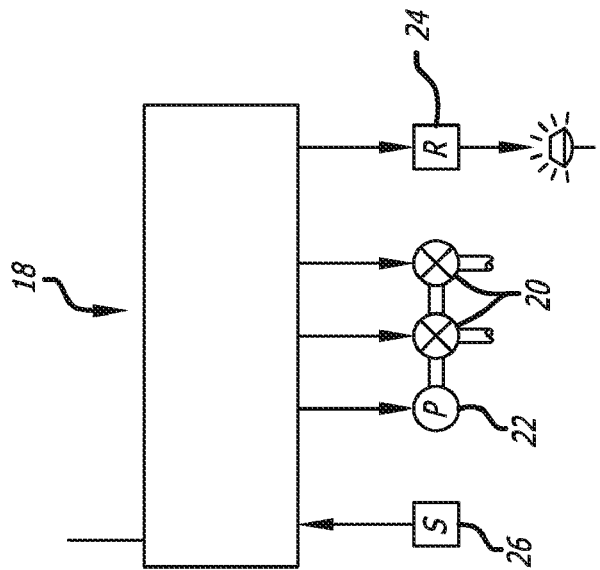
FIG. 1 is a schematic overview of the inventive system.
Figure 1:
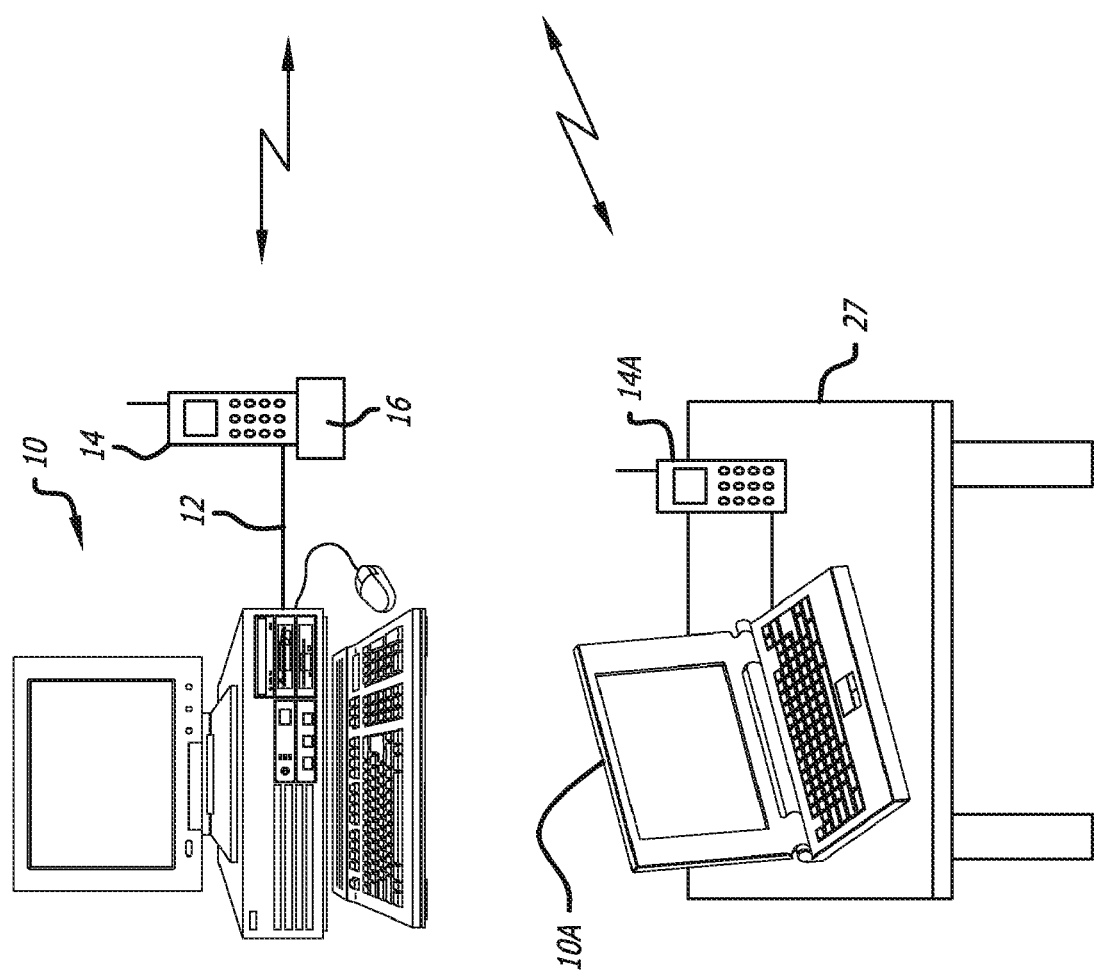
Figure 2A:
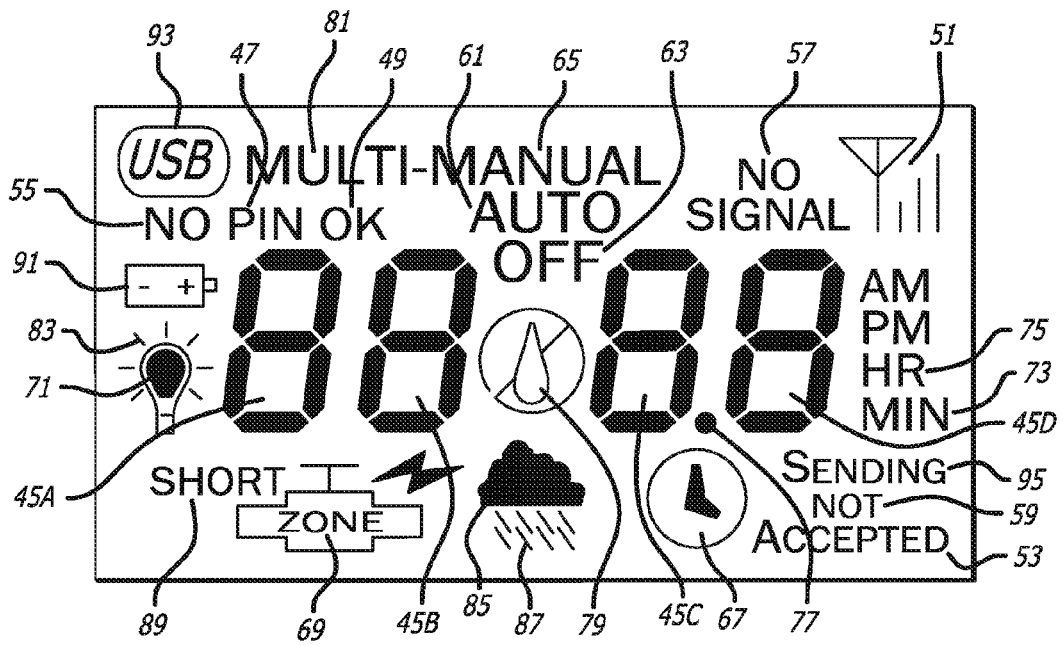
FIG. 2a is an enlarged view showing all the displayable elements of the display.
Figures 2, 3:
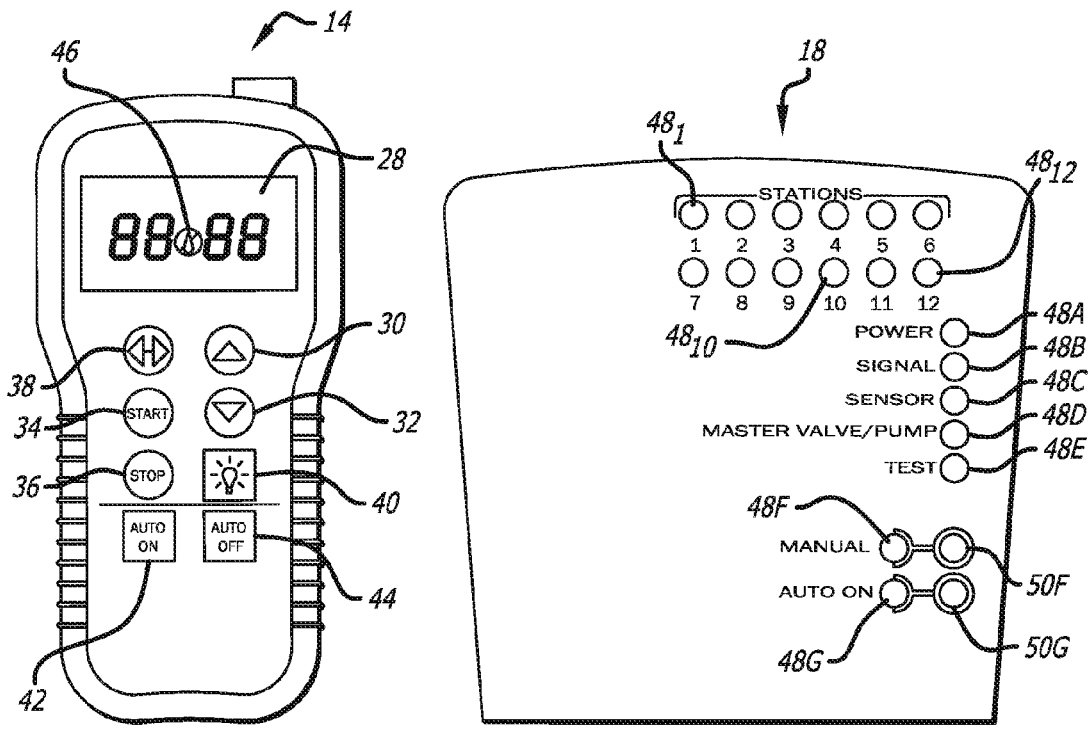
FIG. 2 is a front elevation of the remote showing a portion of the possible display elements displayable on its screen.
FIG. 3 is a front elevation of the controller.

FIG. 1 depicts the basic components of the preferred embodiment of the inventive system. A conventional PC 10 is connectable by a USB cable 12 to a portable remote 14 which may be stored in a desktop stand 16 beside the computer 10. The remote 14, which is described in more detail below in connection with FIG. 2, is arranged to digitally communicate wirelessly with one or more controllers 18 that are mounted in locations convenient for the connection of sprinkler valves 20, pumps or master valves 22, lighting relays 24 and/or sensors 26. The controllers 18 are described in more detail in connection with FIG. 3 below.

For purposes described below, the system of this invention may alternatively be accessed, if desired, within the range capabilities of the wireless system from a contractor's truck 27 or the like by the use of the contractor's computer 10a and remote 14a.

B. The Remote

FIG. 2 illustrates the remote 14. It is battery-powered, microprocessor-operated, and preferably contains a display 28, UP and DOWN buttons 30, 32, zone control START and STOP buttons 34, 36, a shuttle button 38, a lighting button 40, and system control AUTO ON and AUTO OFF buttons 42, 44. Although the primary purpose of the remote 14 is to transmit and receive schedule information and real-time operating status to and from the controllers 18 when it is connected to the computer 10, it has the additional capability in its portable (i.e. disconnected) mode to manually operate selected irrigation or lighting zones, to turn the entire system on or off, and to display limited information about the controller 18. Such information may include the AUTO/MANUAL/OFF state of the controller 18, the status of its rain sensor, the existence of a short circuit in a solenoid, the nature (i.e. lighting or irrigation) of a selected zone, and whether a selected zone is active or inactive. The remote 14 cannot, however, display or alter the schedule stored on the controller 18.

Preferably, the portable functions of the remote 14 are accessed by manipulating the four digits 45a, 45b, 45c and 45d shown on the display 28 with the buttons 30, 32 and 38. The shuttle button 38 scrolls across the display 28 to select a digit and cause it to blink, while the UP and DOWN buttons 30, 32 increment and decrement the digit. To turn on a particular zone in manual mode, the first two digits 45a and 45b are set to the zone number, and the last two digits 45c and 45d are set to the runtime. Then, when the START button 34 is pressed, the appropriate command is transmitted to the controller 18. Receipt of the command is confirmed by a blinking drop symbol 46 in the display 28. At any time, the selected zone may be turned off by pressing the STOP button 36, or operation may be transferred to the next zone by pressing the UP button 30.

As explained in more detail below with reference to FIG. 2a, pressing the lighting button 40 while the remote 14 is unplugged from the computer 10 turns all the lighting relays 24 on for a default time of one hour (or any other time, up to 4 hours, selected by pressing the UP or DOWN buttons 30, 32) to illuminate the property at an unusual time or in an emergency. The system buttons 42, 44 enable and disable, respectively, the automatic operation of the controller 18. As noted above, the buttons of the remote 14 are inoperative when the remote 14 is plugged into the computer 10.

For security purposes, the system of this invention uses a four-digit system PIN which can be set by the PC 10, and which identifies the system in which the remote 14 can operate. When the remote 14 is plugged into the PC 10, it acts as a pass-through which transmits commands from the PC 10 to the controller 18, and transmits acknowledgements and status data from the controller 18 to the PC 10. When the remote 14 is unplugged from the computer 10, it stores any data received from the controller 18, displays selected parts of it on the display 28 as described below in conjunction with FIG. 2a, and transmits it to the PC 10 when it is next plugged in. The PIN of the remote 14 can be changed as described below when it is unplugged from the computer 10. It is consequently possible for a contractor who knows the system PIN and has entered it into his own remote 14a or remote-computer set 14a, 10a, to check and/or adjust the system from the street in front of the user's property without entering the property or requiring the presence of the user.

To set or reset the PIN of remote 14, the shuttle button 38 is held down while the UP button 30 is pressed. The PIN indicator 47 (FIG. 2a) is displayed, together with the last-used PIN as shown by the digits 45a through 45d. The PIN can now be changed by using the shuttle button 28 to move from digit to digit, and the UP button 30 and DOWN button 32 to change the digit's value. The new PIN is transmitted to the controller 18 by pressing the START button 34. If the controller 18 acknowledges a match, the OK indicator 49, signal strength indicator 51 and ACCEPTED indicator 53 are added to the display. If no acknowledgment is received, the NO indicator 55, NO SIGNAL indicator 57 and NOT indicator 59 appear instead. After a few seconds, the display 28 reverts to its normal state of showing only the signal strength indicator 51 and the AUTO indicator 61 or the OFF indicator 63, depending upon the current condition of the controller 18 (If the controller 18 is in manual mode, neither AUTO nor OFF appear).

To operate a zone manually, either the UP button 30 or the DOWN button 32 is pressed. The MANUAL indicator 65, time icon 67, and valve icon 69 or light icon 71 (depending upon the nature of the selected zone) appear, together with the digits 45a through 45d and the MIN indicator 73. Using the SHUTTLE button 38 and the UP and DOWN buttons 30, 32, the desired zone can be set with digits 45a and 45b, while the desired runtime can be set with digits 45c and 45d. Runtimes greater than 59 minutes convert the digits 45c and 45d to hours and tenths of hours by substituting the HR indicator 75 for the MIN indicator 73 and displaying the decimal point 77. When the START button 34 is now pressed, the water drop icon 79 flashes, and the digits 45c and 45d start to count down. Pressing the UP button 32 during this time switches the manual operation to the next zone.

A plurality of zones can be run sequentially in multi-manual mode. The multi-manual mode is initiated by holding the START button 38 down for two seconds or more. The MULTI-indicator 81 is added to the previously described display. In this mode, each selection followed by START is added to a list of zones to be run manually, and a final pressing of START initiates the multi-manual run.

The light button 40 is essentially a single toggle switch for all the lighting zones together. Pressing it brings up the light icon 71, the time icon 67, and the digits 45c and 45d with the appropriate combination of decimal point 77, MIN indicator 73 and HR indicator 75. Simply pressing the light button 40, when acknowledged, outlines the light icon 71 with rays 83 and starts the countdown of the digits 45c, 45d. Runtime can be adjusted in the same manner as the watering zones. During the adjustment, the rays 83 are deleted. Pressing START after the adjustment returns the rays 83 and restarts the countdown.

The rain sensor icon 85 appears when a rain sensor is preventing the controller 18 from running any scheduled watering zones. This action can be overridden by initiating a manual or multi-manual watering as described above. This is indicated by a flashing rain icon 87.

If the controller 18 reports a shorted zone solenoid, the SHORT indicator 89 and the lightning bolt 91 appear. A visit to the controller 18 is then necessary to identify the shorted zone and repair it.

The remote 14 queries the controller 18 every few seconds if it does not get a clear acknowledgment from the controller 18. During that time, the SENDING indicator 95 appears to let the user know that a data download is in progress.

Although the remote 14 is normally powered by the computer 10 through the USB cable, it is equipped with a battery for portable use. A battery icon 91 appears, whenever the remote 14 is disconnected from the computer 10, if the internal battery is low. When the remote 14 is plugged into the computer 10 (and therefore controllable only by the computer 10), only the USB icon 93 is shown, while digits 45b and 45c form the letters PC.

C. The Controller

As seen in FIG. 3, the controller 18 in the preferred embodiment of the invention carries on its face a series of indicators or lights 48 and a set of actuators or buttons 50. In the preferred embodiment of the invention, there is a light 481 through 4812 for each of the preferred embodiment's twelve stations or zone switches. Additional indicators 48a through 48g are provided for purposes described below, as are a pair of buttons 50f and 50g.

The controller 18 is equipped with a wireless transceiver (not shown) that is arranged to communicate with the remote 14. If there is more than one controller 18 in the system, the transceiver also communicates with the next or previous controller 18 in a chain of controllers. The communication protocol is preferably such that one controller 18 is the master, and the others are slaves although master capabilities can be transferred to any one of them or to the remote 14. This allows, for example, rain shut-off of a whole multi-controller system by a single rain sensor 26 connected to the master controller 18, or the operation of a single master valve or pump 22 to provide system water pressure whenever any sprinkler 20 is energized.

The controller 18 is powered from an appropriate external source and is equipped with a conventional microprocessor (not shown) which is programmed, in accordance with conventional programming techniques, to execute the inventive functionalities described herein. Each controller 18 has an identification code including a preferably four-digit selectable system PIN plus a selectable single-digit sequence identifier which identifies its place in a multi-controller chain. If the system includes more than one controller 18, the controller with the sequence identifier "1" is the master controller to which the rain sensor and the master valve (or pump) are connected. The master controller can directly transmit the rain sensor status to the other controllers and to the remote 14, and it can receive from any other controller a request to turn on the master valve when a watering zone on that controller is turned on.

When the physical layout of the system makes it desirable to connect the rain sensor and master valve to another controller, that controller can be made the master simply by switching sequence identifiers with the previous master. For security reasons, this cannot be done from the computer 10 or remote 14, but must be done on the controllers 18 in the field.

Normally, the "Power" light 48a and one of the station lights 481 through 4812 (the latter indicating which zone will run next or, if flashing, which zone is currently running) are on during automatic operation. To set the identification code, the buttons 50f and 50g (which normally initiate manual and automatic operation, respectively) are pushed at the same time to place the controller 18 into identification mode.

In the identification mode, the station lights 481 through 4810 represent the numbers 1 through 0, respectively, while the status lights 48a through 48e represent the identification code digit that is currently being set. Station lights 4811, 4812 and status lights 48f, 48g (which in normal operation indicate, respectively, whether the controller 18 is in manual or automatic mode) are not used in the identification mode.

Simultaneously pushing the buttons 50f and 50g causes "Power" light 48a to flash, thereby indicating that the first digit of the identification code is ready to be set. The digit is set by repeatedly pushing button 50f to sequentially turn on the station lights 481 through 4810. When the station light corresponding to the desired value (e.g. 487 for the value 7) is reached, pressing button 50g sets the chosen value for the first digit. Concurrently, the "Power" light 48a goes back to steady illumination, and the "Signal" light 48b (which normally flashes randomly while radio communication is in progress) flashes regularly to indicate that the second digit of the identification code is ready to be set. The above-described setting procedure is now repeated to set the second digit.

The procedure continues with similarly setting the third, fourth and fifth digits of the identification code while the "Sensor" light 48c, "Master Valve/Pump" light 48d and "Test" light 48e, respectively, are flashing. After setting the fifth digit, pressing the button 50g for a few seconds produces a sequential visual "playback" of the chosen settings before returning the controller 18 to its normal automatic operation mode. It should be noted that although the system PIN portion of the identification codes of all controllers 18 can be set from the PC 10, their sequence identifier cannot.

D. The User Interface

Figure 4:
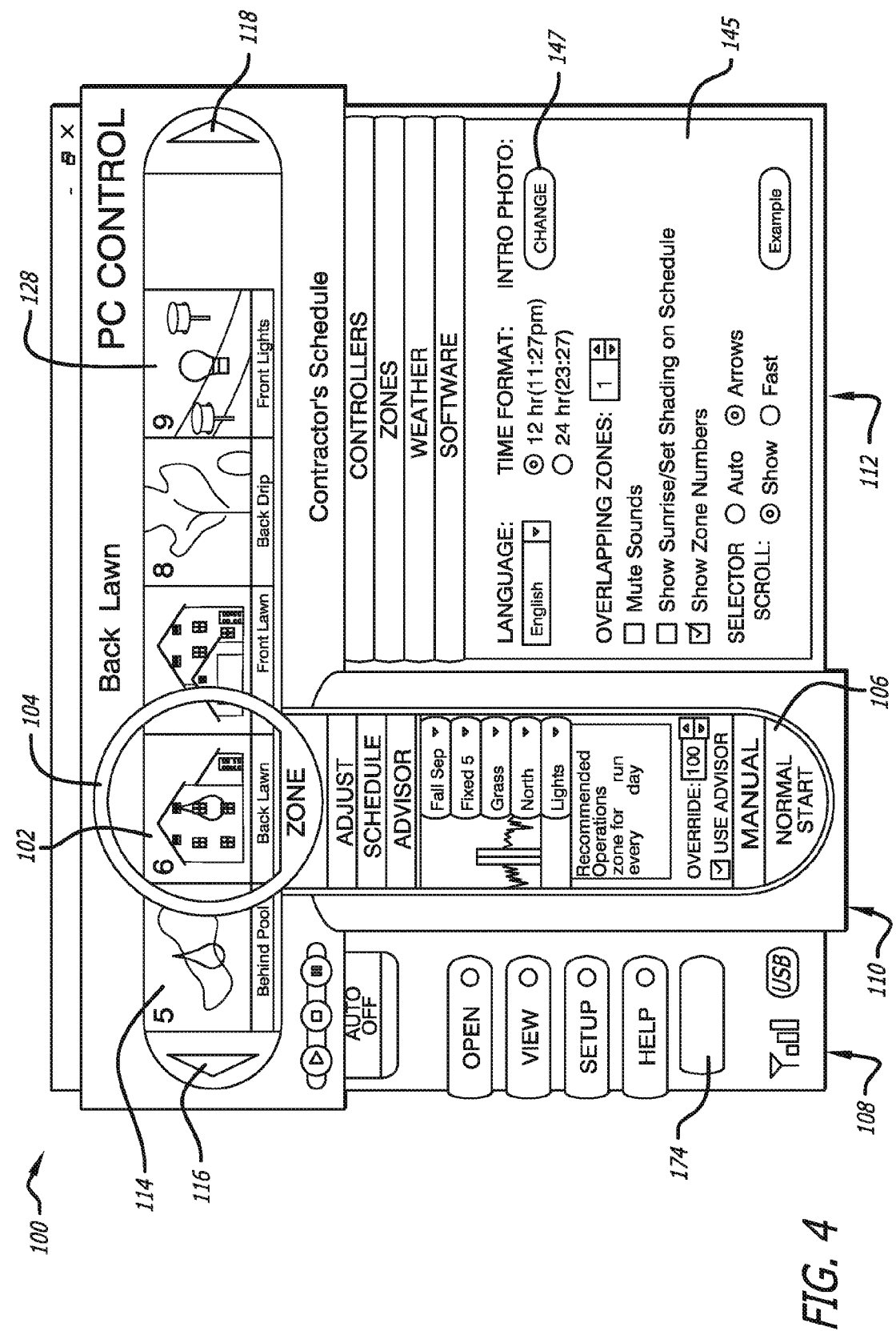
FIG. 4 is a general overview of the graphic user interface of this invention.

Communication between the inventive system and its human operator is accomplished through the intuitive, zone-oriented graphic user interface (GUI) 100 of FIG. 4 et seq. The GUI 100 of the preferred embodiment consists, in its basic form shown in FIG. 4, of four sections: a) a zone definition section 102 which may advantageously take the form of the lens 104 of a magnifying glass with a "handle" 106; b) an action selection section 108; c) a zone control section 110 which may be the "handle" 106; and d) a management section 112.

The GUI 100 is zone-oriented in that all interaction between the operator and the system occurs on a screen or set of screens associated with a single selected zone. The selection of that zone is accomplished by selecting a zone icon in a zone selector or selecting a scheduled event in the weekly or monthly schedule described below. This moves a strip 114 of icons so as to place the icon of the desired zone under the magnifying glass 104. Alternatively, the strip 114 may be moved one icon at a time by clicking the arrows 116, 118. Each icon of the strip 114 is associated with a specific numbered zone. For example, in a system using four controllers 18 controlling twelve stations each, the strip 114 would contain forty-eight icons numbered 1 through 48. The icon under the magnifying glass at any given time determines the zone whose watering or lighting schedule is being defined.

Figure 4A:
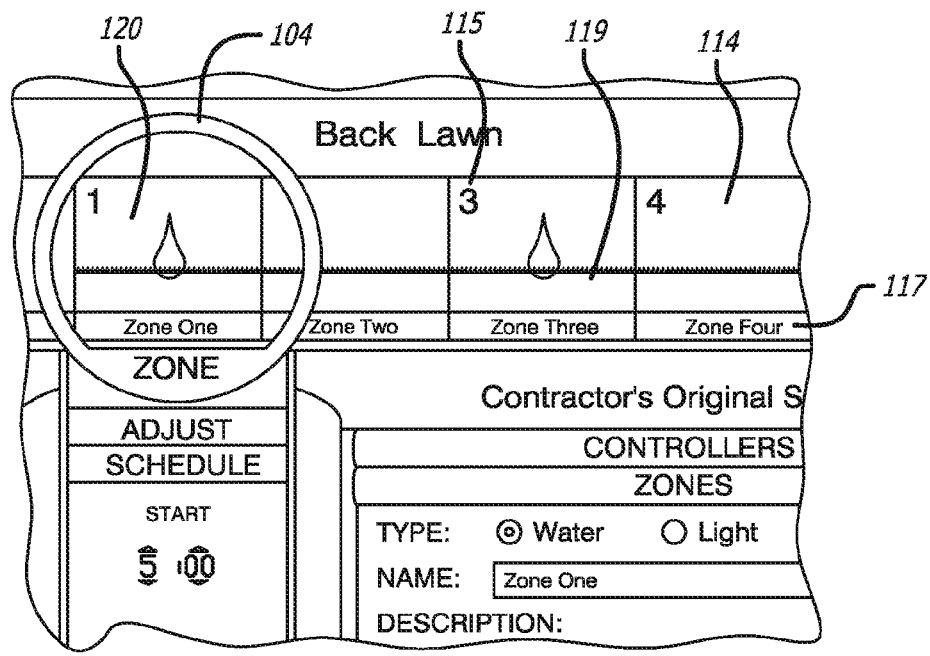
FIG. 4a illustrates the default zone icon.

On initial power-up of the system, all icons of the strip 114 (equal in number to the stations controllable by one controller 18) display their zone number 115 and name 117 (if any), and a default background or stylized generic image 119, e.g. of grass, as shown in FIG. 4a. Because the mere numbering and naming of many similar zones is prone to cause errors in identifying a desired zone, the invention provides a means to modify the icons so that they will display, in addition to their number and name, a readily recognizable photograph of the zone.

Figure 5:
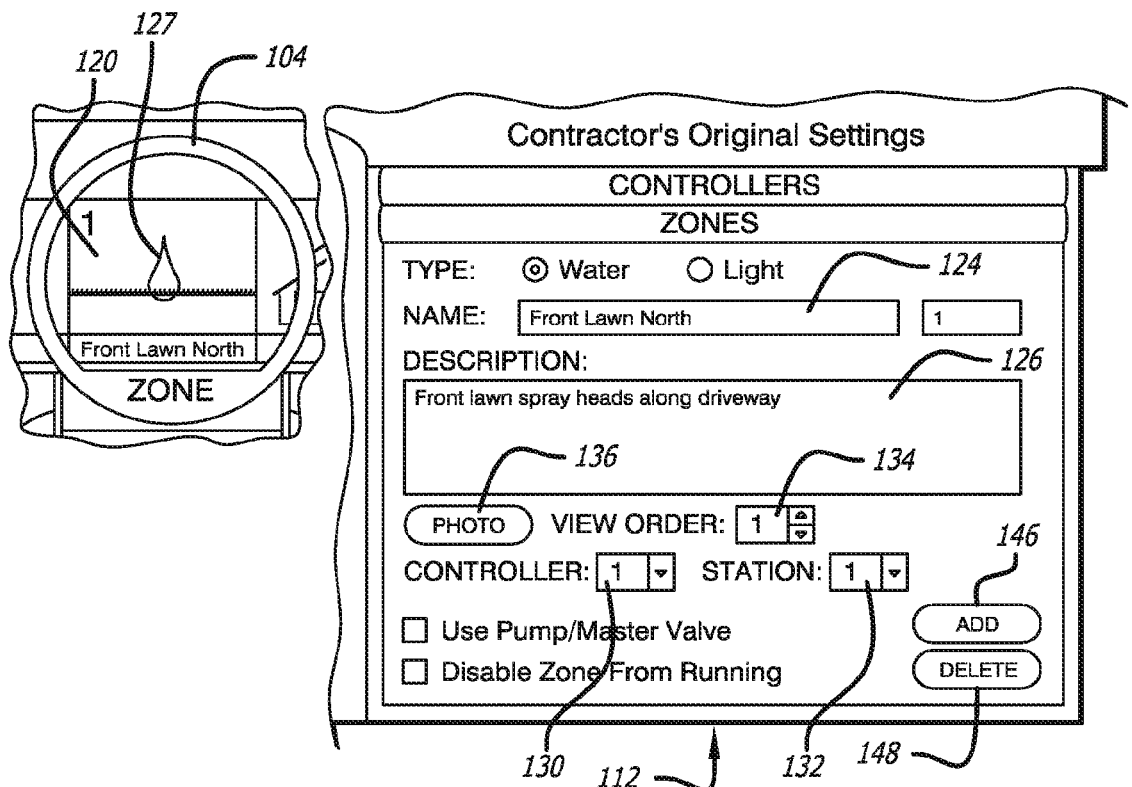
FIG. 5 illustrates the zone subscreen for identifying a zone.

In order to display actual photographs of the system's zones, the relevant photographs may first be taken with a conventional digital camera and stored as JPEG (or other appropriate format) files in a conventional image folder on the computer 10 or on a disc. The GUI 100 is then opened, SETUP is clicked in the action selection section 108 (FIG. 4), and ZONES is clicked in the management section 112 (FIG. 5). In this view, a click on the icon 120 of zone 1 (or other appropriate manipulation of the icon strip 114 with the mouse) brings icon 120 under the lens 102 of the "magnifying glass" 104. By typing a name for zone 1 in the box 124 and (optionally) a description of zone 1 in the box 126, and selecting the "Water" or "Light" option, the lens 102 will display, above the name of the zone, a default image overlaid with the zone number "1" and either the water drop symbol 127 or the light bulb symbol 128 (FIG. 4). The presence of either symbol indicates that the zone in question is scheduled to operate today; if it is blinking, the zone is currently operating. The controller number and station number corresponding to zone 1, and the desired position of icon 120 in the strip 114, may be entered in boxes 130, 132 and 134, respectively.

Figure 6A:
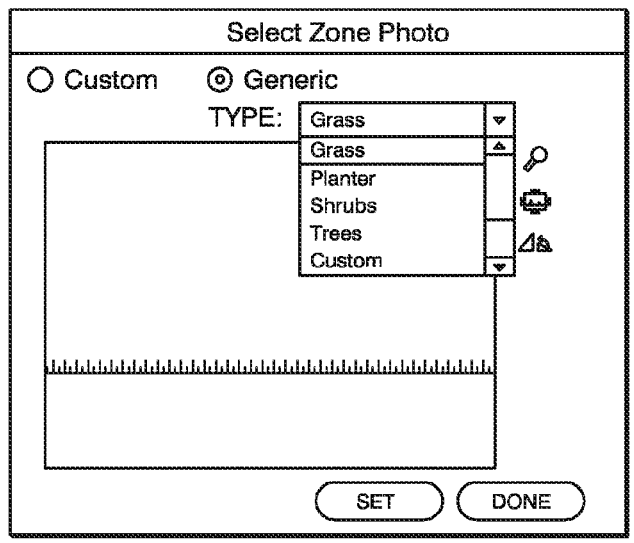
FIG. 6a illustrates the selection of a generic zone icon.
Figure 6B:
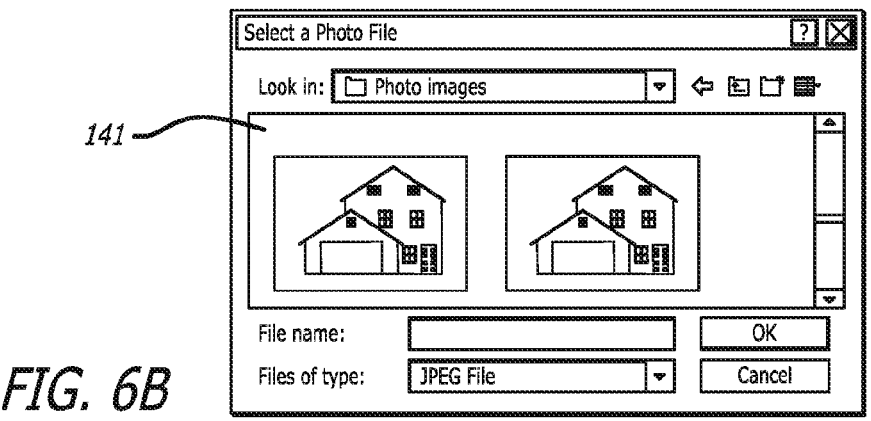
FIGS. 6b and 6c illustrate the selection of a photographic image as a zone background.
Figure 6C:
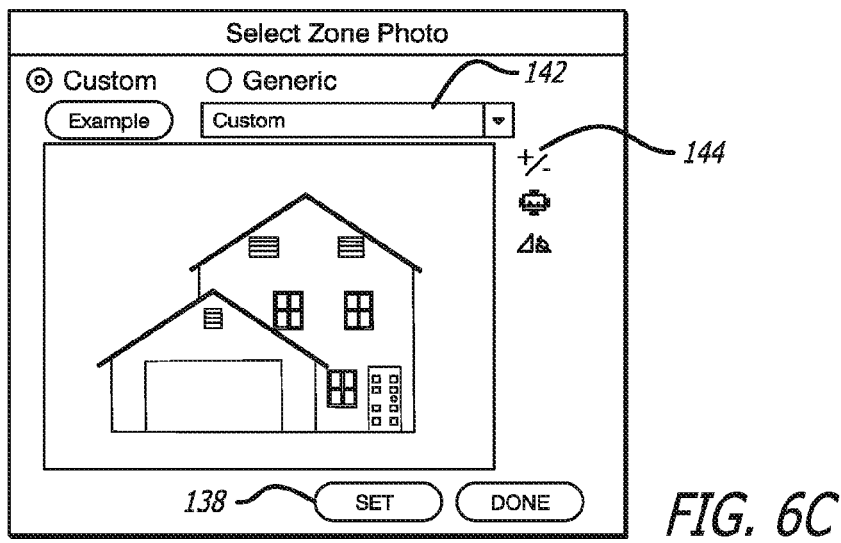
Figure 7:
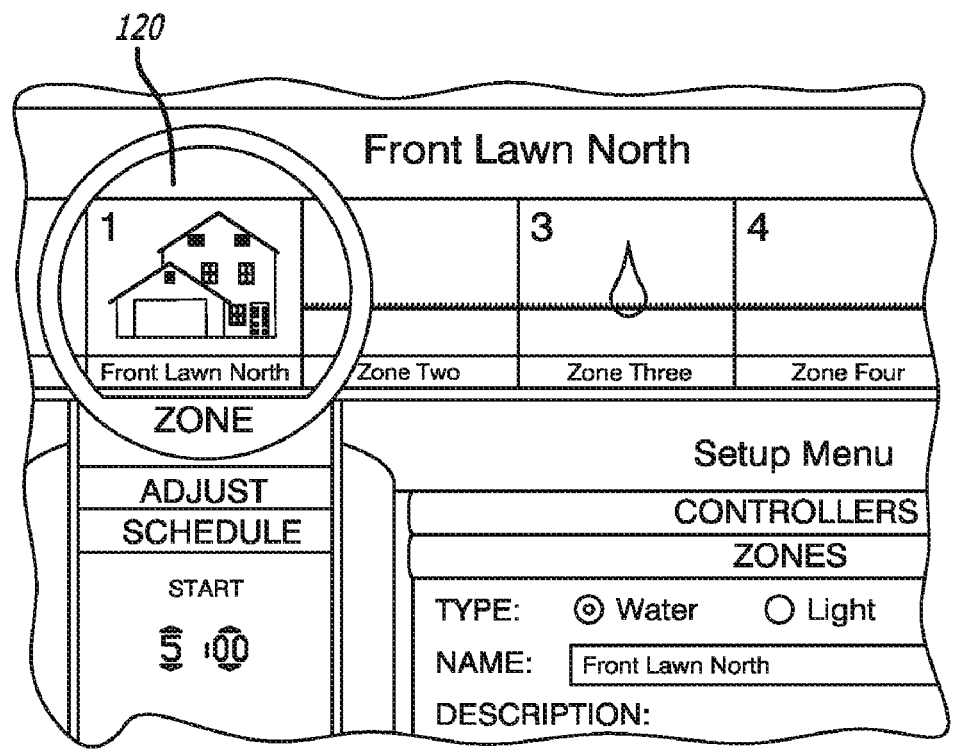
FIG. 7 shows the result of the procedures of FIGS. 6a and 6b.

If it is now desired to replace the background of icon 120 with a photograph, the "PHOTO" box 136 is clicked. This brings up a subscreen (FIG. 6a) that provides a selection of generic vegetation type images in case no photos are available. Clicking the "SET" box 138 enters the selected image as the background of icon 120. Clicking the "Custom" box 140, however, opens a browser 141 (FIG. 6b) which enables the selection of any photograph stored in the image folder or disc. Clicking the selected photograph in FIG. 6b causes it to appear in FIG. 6c in place of the generic grass image of FIG. 6a, together with an indication of its origin in box 142. The zoom button 144 can be used to adjust the size of the photograph to fit the area of the zone icon 120). When the "SET" box 138 is now clicked, the chosen photograph becomes the background of zone 1 icon 120 (FIG. 7). The above-described process is then repeated for the remaining zones, ending up, e.g., in the screen of FIG. 4.

By clicking "SOFTWARE" in the management section 112, a subscreen 145 (FIG. 4) is presented which allows, when box 147 is clicked, and in the same manner as described above, a photograph of, e.g., the house to be substituted for the system manufacturer's logo in the startup screen (not shown) that typically appears at each startup of the software. This helps to identify the system and may be useful in quickly identifying a stolen computer.

It will be noted that the "ZONES" screen in the management section 112 of FIG. 5 contains "ADD" and "DELETE" buttons 146, 148. Clicking "DELETE" removes the current zone and its icon from the GUI 100. This is useful when less than all of the zones will be used. Conversely, clicking "ADD" will add a new icon, with the lowest unused zone number, to the strip 114. This allows the expansion of the system with a minimum of reprogramming.

Figure 8:
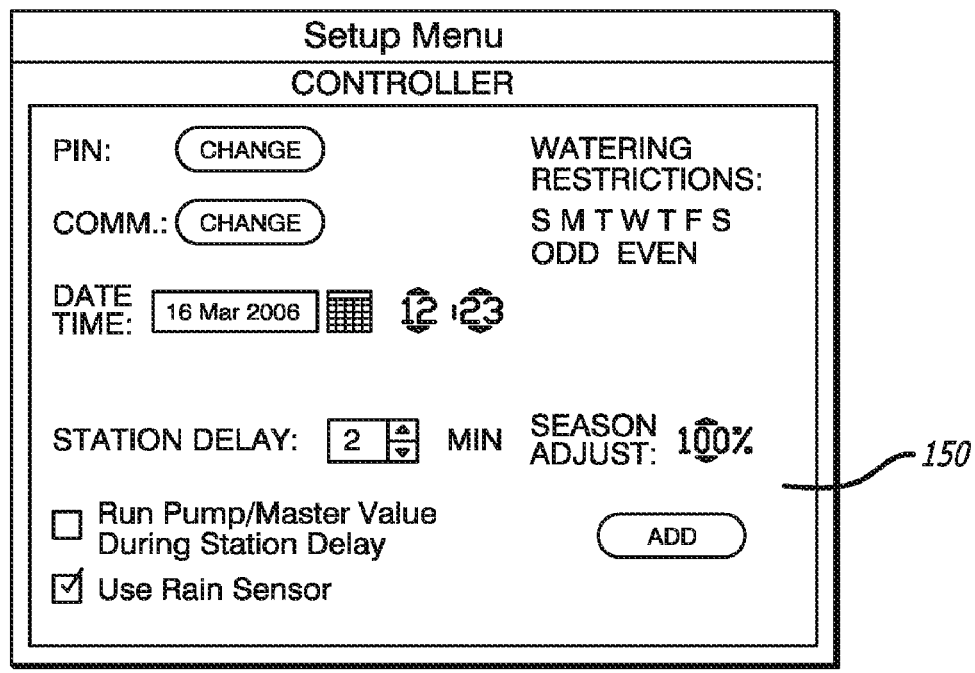
FIG. 8 shows the controller set-up subscreen.

While still in "SETUP" mode, clicking "CONTROLLER" in the management section 112 brings the GUI 100 to the display of FIG. 8. In that display, the characteristics of each controller 18 used in the system can be determined on the controller screen 150 appearing in the management section 112. The screen 150, in the clearly discernable format of FIG. 8, allows a systemwide choice of personal identification number (PIN) for access to the system; a communications check for each controller 18; a choice of non-watering days for personal or legal reasons; a delay between the turn-on of the pump or master valve (if any) and the turn-on of the sprinklers; the system time and date; a selection of whether or not the system will respond to a rain sensor; and a system-wide seasonal percentage adjustment to globally vary the runtime of all sprinklers without reprogramming the system.

The events in all schedules are timed in accordance with the operating system clock of the computer 10. In most modern computers, that clock sets itself to daylight saving time in the summer. Because natural processes such as sunrise and sunset do not go on daylight saving time, the user may desire to offset the operation of the inventive system from the time called for by the operating system. Consequently, setting the system time and date on the subscreen 150 differently from the computer's operating system time and date creates an offset which is then applied to all time and date calculations performed by the inventive program.

FIGS. 9a through 9d illustrate the setting of the operational modes of a chosen zone with the aid of the various screens available in the "handle" (i.e. zone control) 106 of the "magnifying glass" 104. For example, clicking "SCHEDULE" in the handle 106 brings up the screen of FIG. 9b which allows the establishment of a fixed schedule. An examination of FIG. 9b will show that it allows the setting of a start time, runtime and interval (as shown, every Monday, Wednesday and Friday). If it turns out (in an irrigation zone) that the zone is consistently too dry or too wet, this can be remedied by clicking "ADJUST" to bring up the screen of FIG. 9a. The slider 152 on that screen can be moved up and down with the mouse to increase or decrease all of the zone's watering events (whether set automatically or manually) by a common percentage, e.g. 50% to 200%.

Figure 9D:
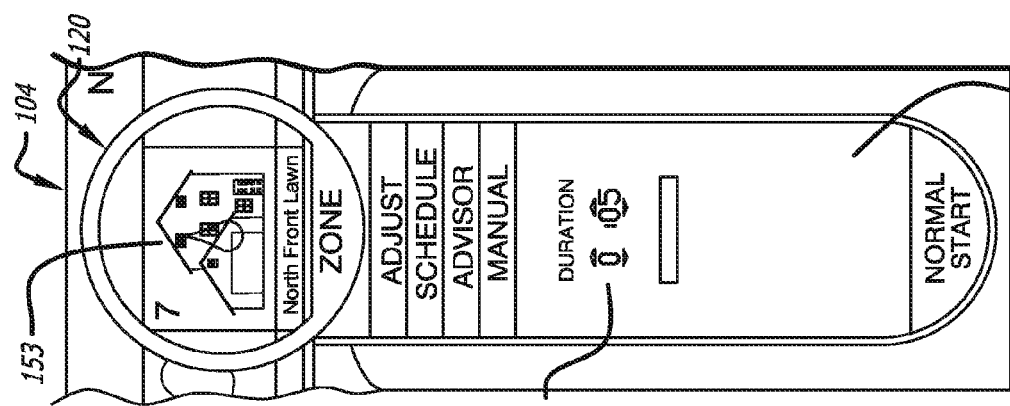
FIGS. 9a through 9d illustrate four types of selectable zone subscreens.

Manual operation of the selected zone can be achieved by clicking "MANUAL" to bring up the screen of FIG. 9d. On that screen, a manual runtime or duration can be set at 154, and the zone can be turned on or off by clicking "START" or "STOP" as the case may be. In that condition, the legend "MANUAL" is overwritten at 153 onto the zone image 120 to indicate that the corresponding zone will not operate automatically.

Figure 9C:
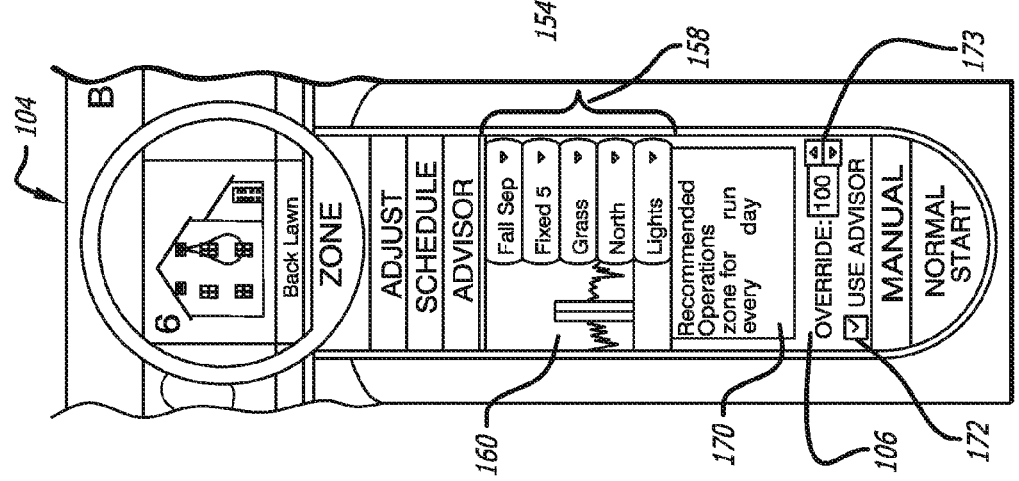
Figure 9B:
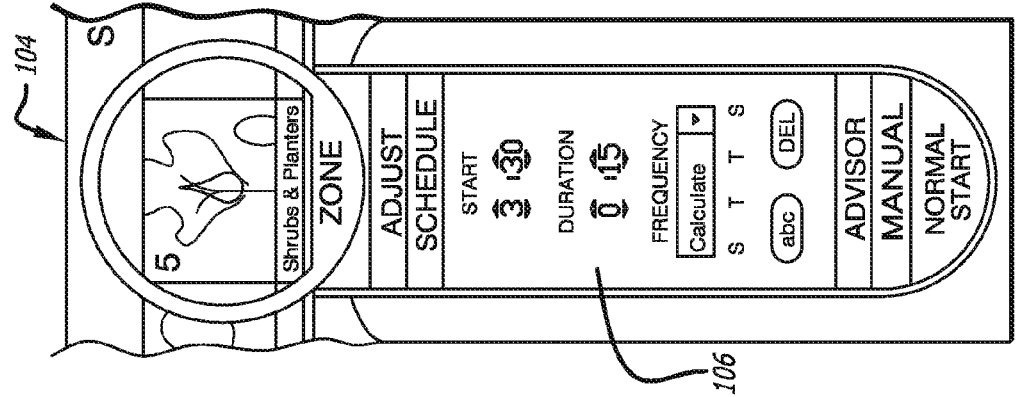
Figure 9A:
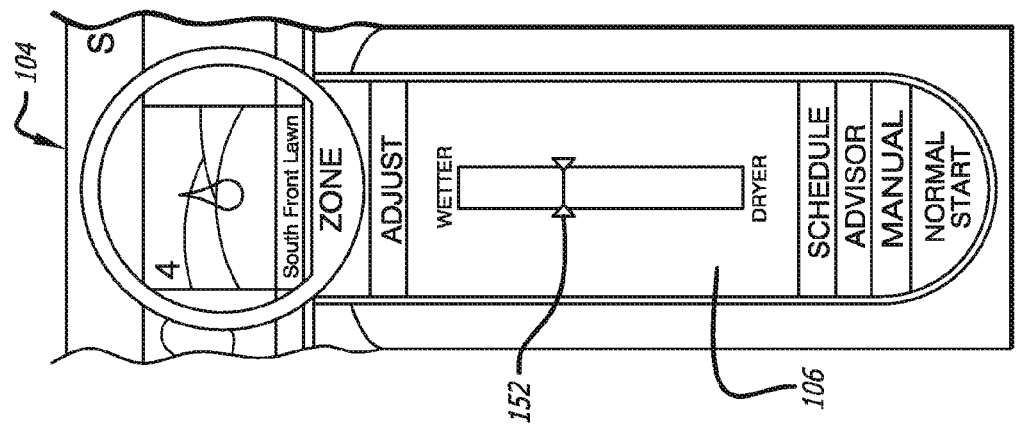

Clicking "ADVISOR" on the handle 106 brings up the screen of FIG. 9c which is the set-up screen of the Scheduling Advisor™ feature of the invention. In order for the software to calculate a recommended watering schedule for a selected zone, the software must know the vegetation type, soil type, sprinkler flow rate, slope and exposure of the zone. These parameters can be set by the buttons 158. Clicking any parameter button 158 brings up a subset of buttons (not shown) listing the available settings selectable for that parameter. The chosen sprinkler type (which governs the nominal flow or precipitation rate) is advantageously illustrated at 160.

The global parameters used by the Scheduling Advisor™ are set by clicking "WEATHER" in the management section 112. This brings up the screen of FIG. 10. In order to use the Scheduling Advisor™ feature for semi-automatic operation, the system's location must be entered at 162, and the average weather conditions expected by the user for the foreseeable future must be entered at 164. For fully automatic operation (which requires that an Internet connection be available), clicking "FORECAST" at 166 will link to an appropriate governmental or commercial weather forecasting site and download relevant entries at 165, at intervals determined by the update interval selection at 168. For lighting zones, the forecasting site provides sunrise and sunset data at the location entered at 162, which can optionally be used by the homeowner for the automatic setting of lighting times.

Figure 10:
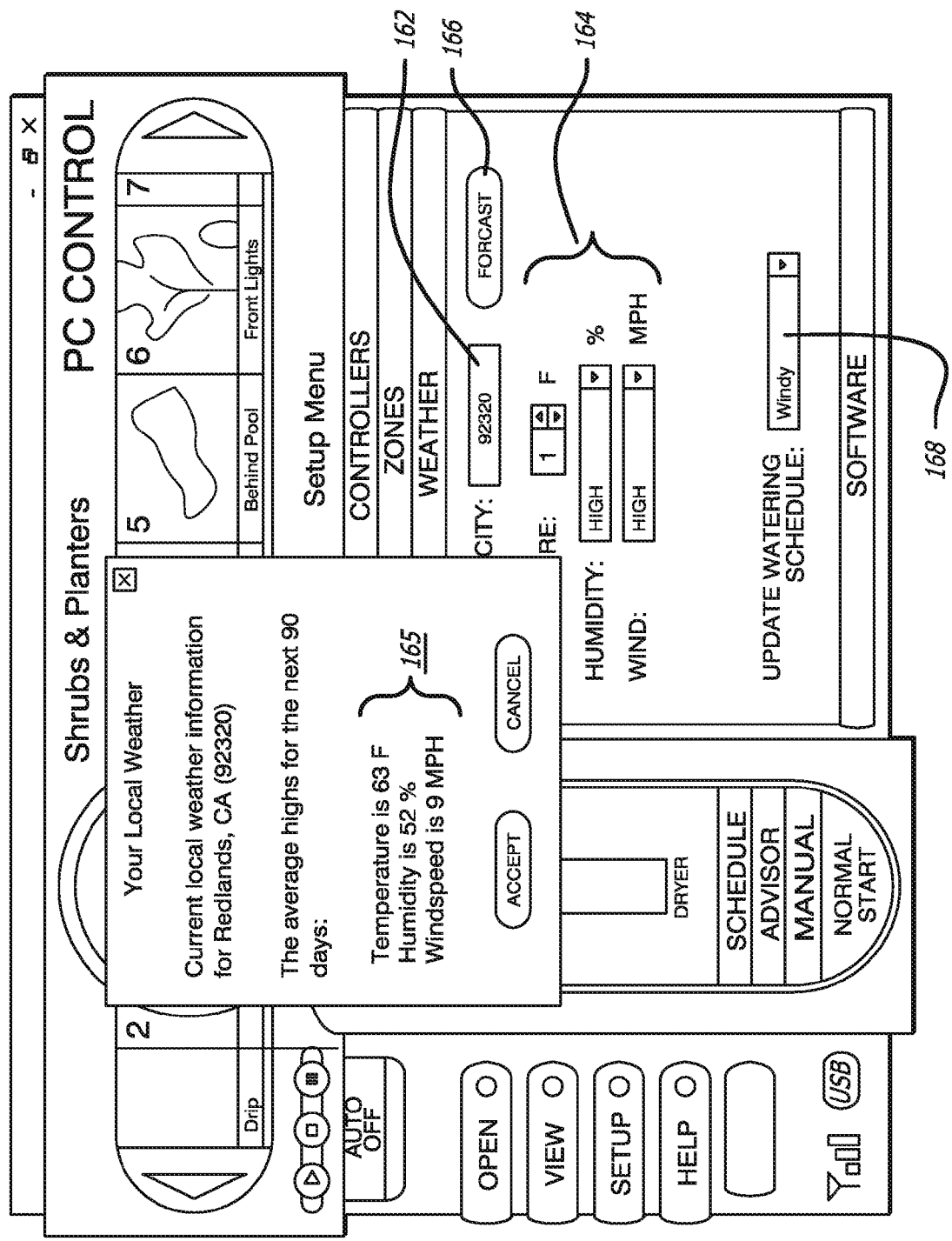
FIG. 10 illustrates the Schedule Advisor™ subscreen.

Based on the selected physical characteristics (i.e. sprinkler type, exposure, slope, soil etc.) of the various zones and the geographical location and weather conditions entered at 164, the Scheduling Advisor™ now computes for each watering zone, in the manner described below, an optimum operating schedule for, e.g., the next nine days, based on nine days of forecast weather data. This proposed schedule is shown at 170 in FIG. 9c (for example, 170 in FIG. 9c might read "Recommend watering this zone for 9 min. every 3rd day"), and the user is given the opportunity at 172 to use the recommended schedule and to adjust or override it to make it more closely match the user's expectations. If the user elects to use the Advisor, any manually scheduled settings are erased, and the system then adjusts itself automatically at the update intervals selected at 168 (FIG. 10).

The operation of the Scheduling Advisor™ is based on the recognition that optimum watering is dependent on two interdependent but separately functional variables: runtime and interval. The runtime is determined by the amount of water needed in any given irrigation cycle to maintain the soil moisture at root level within a predetermined range. The interval, on the other hand, is determined by the climatological water loss due to evapotranspiration (ET). The two variables are interrelated in that runtime divided by interval must equal the total amount of irrigation required to maintain soil moisture generally constant during a given period of time.

Theoretically, plants can survive without runoff as long as the soil moisture is between field capacity (i.e. the maximum amount of water the soil can hold) and the wilt point (i.e. dryness sufficient to visibly impair a plant's condition). In practice, however, healthy plant growth requires that the soil moisture at root level be kept within a much smaller range. This range is known as the managed allowable depletion (MAD) range, which varies by plant type and soil characteristics. The objective of the Scheduling Advisor™ program of this invention is to maintain the soil moisture in the MAD range using a minimum number of watering cycles.

Figure 11:
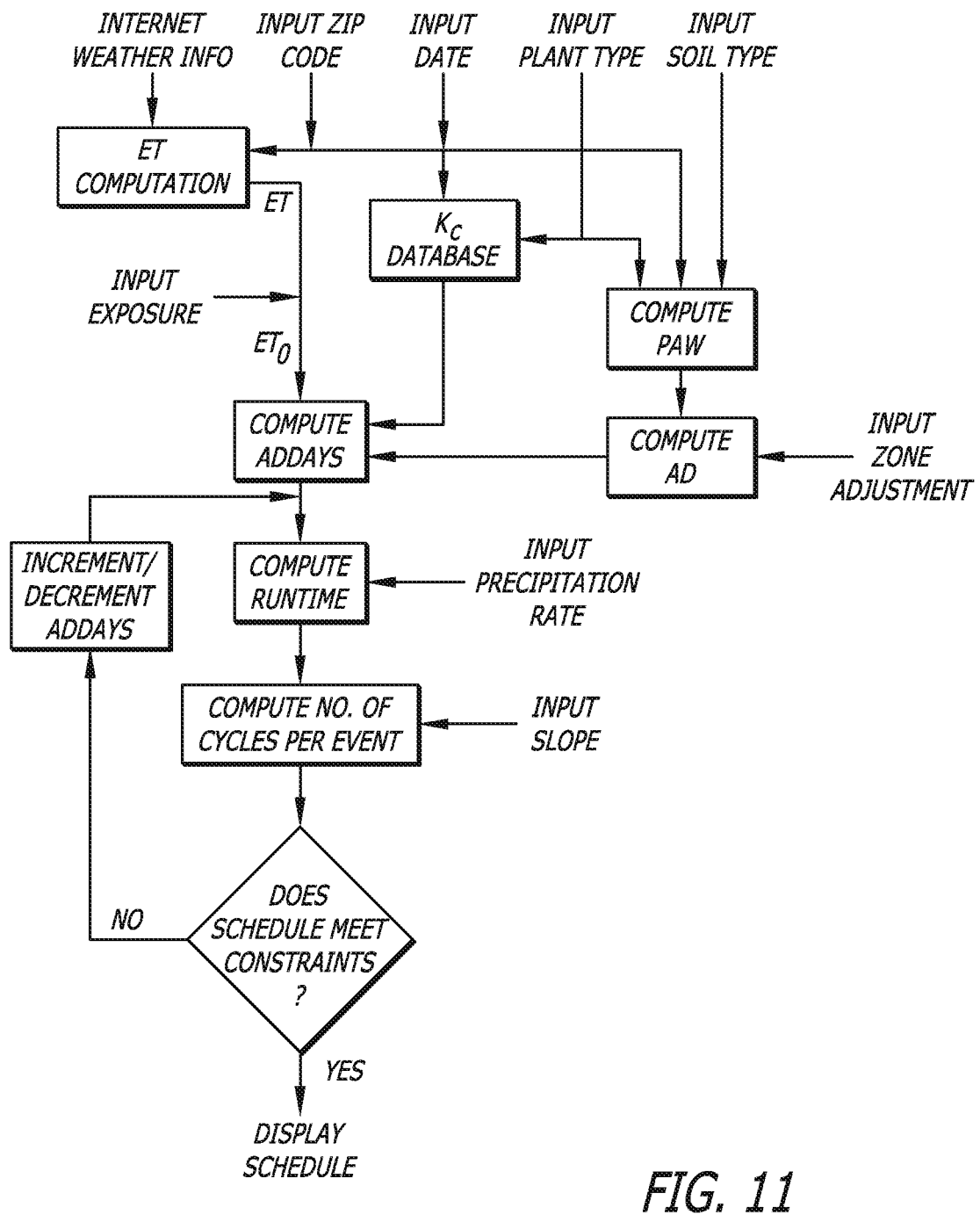
FIG. 11 is a flow chart of the Schedule Advisor™ feature.

The Scheduling Advisor™ program of FIG. 11 now accesses, once a day, one of the government or private Internet weather services, such as weather.com, to compute basic ET information for the next nine days. The weather service uses a standard formula known as FAO-56 to calculate that information daily for every zip code on the basis of date, latitude, elevation and forecast weather including at least temperature, humidity, wind speed, cloud cover and precipitation. The daily ET values forecast for the next nine days may then be averaged and modified for each zone based on the zone's exposure and vegetation type. The result is a measure of the total amount of water the zone is likely to lose per square foot during the nine-day period.

For domestic residential installations, it is usually not desirable to water each zone every day. On the other hand, it is undesirable to allow the soil moisture to exceed the MAD range in either the dryness or wetness direction. In order to ascertain the amount of water that needs to be replaced by each watering event, the inventive program calculates, separately for each zone, the following formulas:

$$PAW = \text{root depth} * AW \tag{1}$$

$$AD = MAD * PAW \tag{2}$$

$$AD\text{days} = AD/(ET0 * Kc) \tag{3}$$

In these formulas,

PAW represents plant available water or soil reservoir capacity;

Root depth depends on the time of year (i.e. the date and geographic location), and the plant type and the soil type entered for the zone;

AW represents the available water in the soil. It depends on the plant type and soil type, and is essentially the field capacity minus the wilt point;

AD represents the allowable depletion, which is the amount of water that can leave the root zone before needing to be replaced.

MAD is the selected managed allowable depreciation, which is the percentage of water that should always be made available to the plant. This again depends on the plant type and soil type, and the override adjustment entered by the user;

ADdays represents the allowable depreciation days, i.e. the number of days in which the AD amount of water will be gone due to evapotranspiration;

ET0 represents the basic ET figure calculated from the weather service and adjusted for exposure, and Kc represents an empirically determined crop coefficient which is a function of the date in the growing season at the system's zip code, and of the type of plant being grown in the zone. Representative values of Kc for various conditions are available from research publications.

The soil type determines the infiltration rate of water into the soil. This in turn determines the MAD range which controls the volume of water needed per irrigation event. The interval between irrigation events is thus $$\text{Interval} = AD/ET0 * Kc \tag{4}$$

and the runtime is $$\text{Runtime} = AD/(Pr * 60) \tag{5}$$

in which Pr is the precipitation rate determined by the user's choice of irrigation devices for the zone involved.

The runtime for each watering event is thus determined by the volume of water to be delivered, the precipitation rate, the plants' root depth, and the ability of the soil to absorb water (i.e. the infiltration rate). Empirical data regarding the last two factors is available in published research. The infiltration rate, precipitation rate and slope come into play again in determining the number of watering cycles per watering event necessary to avoid runoff.

The number of cycles is $$NC = \text{Total runtime}/IR \tag{6}$$

in which IR is the infiltration rate of the soil, which is a function of the soil type, the selected surface slope, and to a lesser degree the plant density and soil compaction. The latter can be handled by a selected zone adjustment if necessary. Finally, the runtime per cycle is $$RPC = \text{Total runtime}/NC \qquad (7)$$

At this point, a basic watering schedule has been established. The inventive program now modifies that schedule to take into account constraints imposed by user inputs (e.g. non-watering days) or controller features (e.g. 7-day maximum interval or limited number of start times per event). Because the interval has to be an integral number of days, such modifications use normalization to recalculate both the interval and the runtime to match the constraints, unless a satisfactory approximation can be obtained by rounding.

In order to provide the user with the ability to override the schedule computed in accordance with this invention, the program contains an override control accessible with the PC's mouse to arbitrarily increase or decrease watering for a particular zone. In accordance with one aspect of the present invention, this override is accomplished not by simply changing the runtime by a percentage as is conventionally done, but by adjusting the normalization used in the program's calculations. This allows the user to change the overall watering of a zone by a simple adjustment (173 in FIG. 9c) without compromising the program's ability to compute an optimal schedule, i.e. both runtime and interval.

When the system has been checked out and all the parameters and operational modes of the software program have been set (or left in their default condition), the schedule is ready to be transmitted to the controller 18. For this purpose, an "UPDATE CONTROLLER" button 174 appears in the action selection section 108 of the GUI 100 (FIG. 4) whenever any change has been made in the program. Clicking this button uploads the current schedule through the remote 14 to the controller or controllers 18.

Because a zone-by-zone non-automatic setup of the system can be lengthy (a preferred embodiment of the invention may be able to control four twelve-station controllers for a total of forty-eight zones), it is desirable that a schedule once established, but later superseded by another, can be recalled at any time by a simple mouse click. For this purpose, clicking "OPEN" in the action selection section 108 brings up a Schedule screen 176 (FIG. 12) in the management section 112 of the GUI 100. The Schedule screen 176 acts like a folder containing a set of files 178, each of which contains in turn a complete operational schedule for each zone of the system. The individual schedules 178 can be named, opened, copied, newly created, deleted or imported by clicking the appropriate buttons 180, 182 in FIG. 12. This makes it possible, for example, to program a different set of schedules for different months or seasons, and then to select the appropriate schedule without reprogramming any zone.

Figure 12:
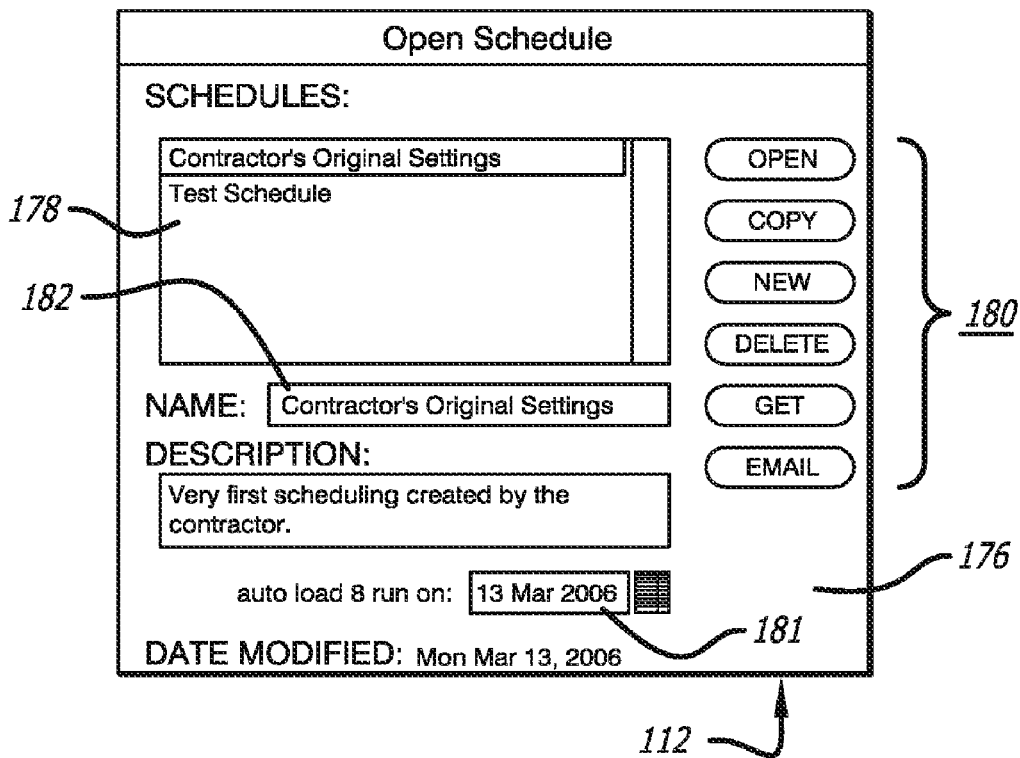
FIG. 12 illustrates the schedule selection subscreen.

A button 181 may also be provided in the screen of FIG. 12 to allow the effective date of a schedule to be delayed, as for example when the user plans to be out of town over a time period during which a change in watering needs can be anticipated. When a date is entered at 181 and the button is checked, the schedule highlighted at 178 automatically replaces the then current schedule (if any) on the selected date and runs it from that point on.

Highlighting a desired schedule in window 176 and clicking "OPEN" in the button set 180 brings up the Weekly Schedule subscreen 183 (FIG. 13), which graphically shows the current start time and runtime of all scheduled zones during a selected week. The screen 183 also contains a button 184, which can be clicked to bring up a Monthly Schedule screen (not shown) that illustrates which zones will run (but not at what time or how long they will run) on any given day of a selected month.

Figure 13:
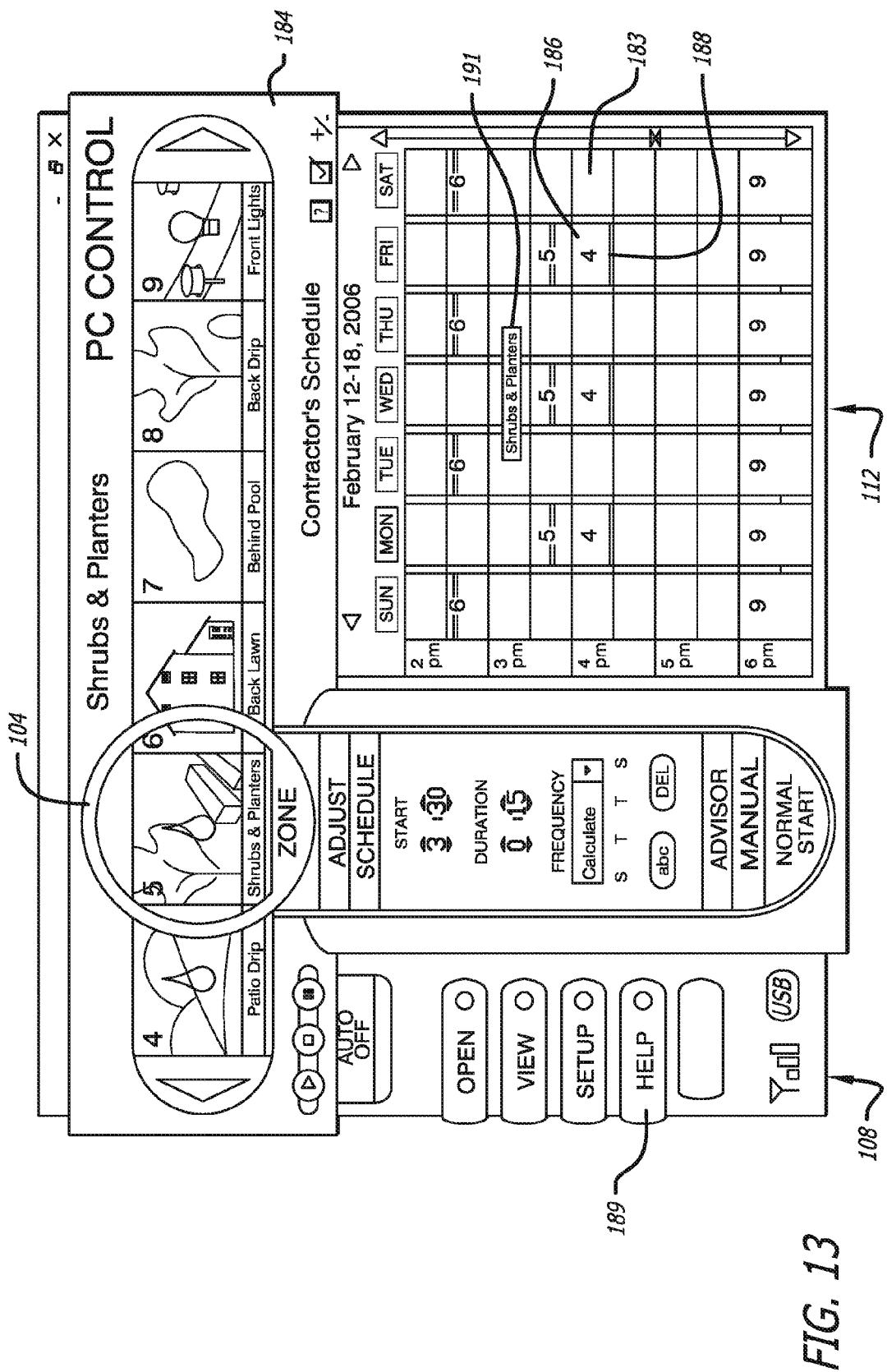
FIG. 13 illustrates the weekly schedule view.

The Weekly Schedule subscreen 183 of FIG. 13 graphically shows, for any day of a selected week, the times at which each of the scheduled zones (4, 5, 6 and 9) of the system will run. In this screen, the scheduled water or light events for a zone are identified by numbered icons that have a body 186 and a handle 188. Any zone icon can be moved to another time and day by clicking and dragging the body 186, and its running time can be lengthened or shortened by clicking and dragging the handle 188 up or down. For greater clarity, the body 186 of the currently selected zone's icons is of a different color than the bodies 186 of icons for zones not currently under the lens 104. The zone currently under the lens 104 is identified by its name at 191 on the subscreen 182.

The selection of a schedule for any given zone currently under the lens 104 is initially done during set-up in the SCHEDULE mode of the zone control section 110 as described above in connection with FIG. 9b. After all the active zones have been scheduled, the Weekly Schedule screen 182 can be opened, and the interrelation of the zones can be graphically observed.

It will be noted that the intuitiveness of the GUI 100 is enhanced by the accordion-like arrangement of the zone control section 110 and management section 112. For example, as shown in FIGS. 9a through 9d, successive clicking of SCHEDULE, ADVISOR and MANUAL moves those tabs to the top of the "handle" 106, as if pages had been turned on a notepad. Clicking any of these tabs while on the top moves it back to the bottom. In each position, the GUI 100 also displays in the management section 112 a setup menu with a number of pages such as CONTROLLERS, ZONES, WEATHER and SOFTWARE which can be accessed in the same manner. Similar multi-page screens are also accessible by the HELP 189 button in the action select section 108. Thus, operation of the GUI 100 resolves itself into an intuitive succession of logical selections as in a decision tree.

All the settings, GUI screens and icons of each irrigation and lighting schedule 178 of FIG. 12, whether user-selected or automatically produced, are stored as files on a storage disc in the memory of computer 10. Thus, they may not only be recalled at any time, but they may be transmitted as e-mail as described below. This enables a landscaping contractor familiar with the system's layout to, for example, set up a customer's program in the shop and upload it onto the customer's computer without traveling to the system's location, or to download a program from a customer's computer and troubleshoot or repair it in the shop.

The manner in which this is accomplished is illustrated in FIGS. 14 through 16b. Upon clicking the E-MAIL button 192 in FIG. 14, a subscreen 194 appears to allow the user to choose between receiving or transmitting a schedule.

Figure 14:
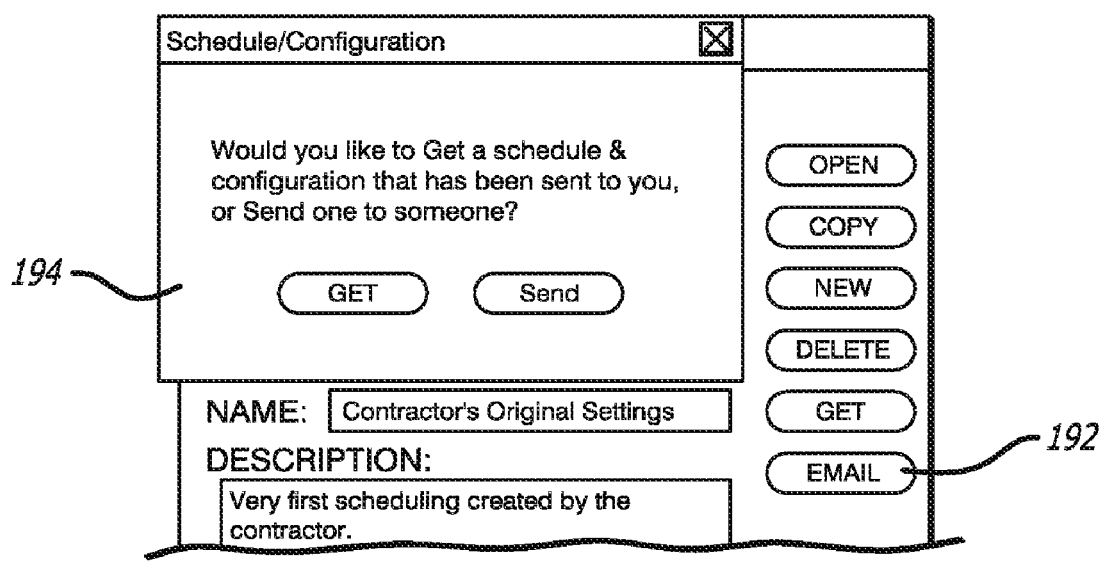
FIG. 14 illustrates the e-mail opening subscreen.
Figure 15A:
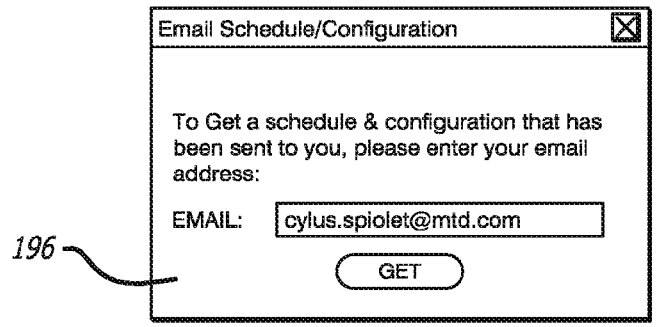
FIGS. 15a and 15b illustrate the schedule-receiving subscreens.
Figure 15B:
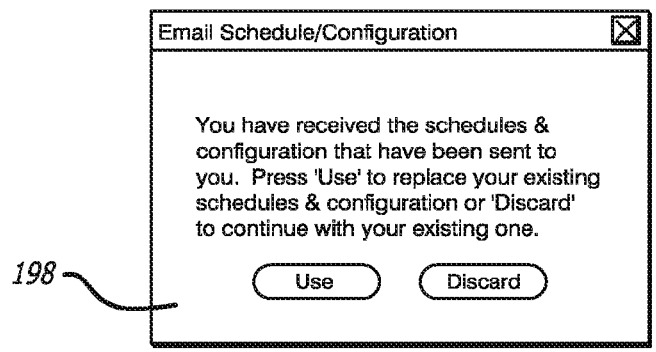

Selecting "Get" in FIG. 14 produces the subscreen 196 of FIG. 15a which requests the user to enter his or her e-mail address. Doing so and clicking "Get" again causes the program to retrieve an e-mailed schedule file. Thereupon, the subscreen 198 of FIG. 15b appears. When the user selects "Use", the received e-mail file is added to the schedules 178 of FIG. 12, where it can be examined and used if desired.

Figure 16A:
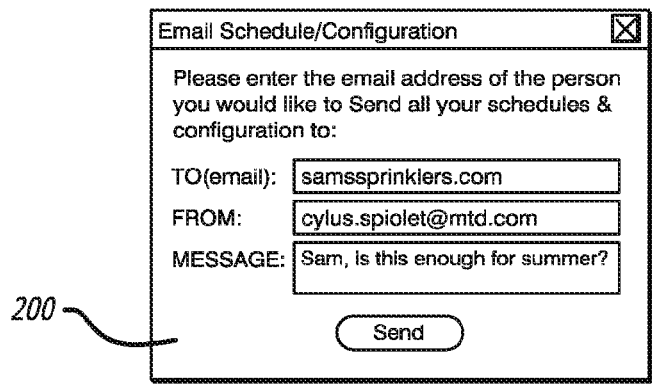
FIGS. 16a and 16b illustrate the schedule-sending subscreens.
Figure 16B:
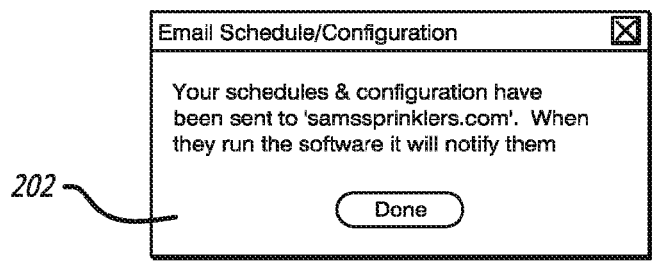

Selecting "Send" in FIG. 14 produces the subscreen 200 of FIG. 16a which asks for the sender's and addressee's e-mail addresses, as well as for any message to accompany the e-mailed file. Clicking "Send" again transmits the e-mail and produces the subscreen 202 of FIG. 16b which acknowledges the successful transmission.

What is claimed is:

1. A landscape control system comprising:
a landscape controller configured to control a plurality of independently controllable zones within a landscape;
a computer in communication with said landscape controller; and,
landscape control software executable by said computer; said landscape control software comprising:
an irrigation control interface configured for designating a selected zone of said plurality of independently controllable zones; displaying a zone image associated with said selected zone; and displaying at least some irrigation schedule modification controls corresponding only to said selected zone; and
a zone image selection interface configured to allow a user to designate an association between each of said plurality of independently controllable zones and a corresponding image.

2. The landscape control system of claim 1, wherein said zone image is a digital photo.

3. The landscape control system of claim 2, wherein said landscape control software is further configured to create a schedule to operate landscape lighting equipment.

4. The landscape control system of claim 3, wherein said zone image is displayed as an icon by said landscape control software.

5. The landscape control system of claim 4, wherein said landscape control software is further configured to email said irrigation schedule to a user-selectable email address.

6. The landscape control system of claim 5, wherein said landscape control software is further configured to import an existing irrigation schedule emailed to said computer.

7. A landscape controller system comprising:
an irrigation controller configured to control a plurality of irrigation zones;
a computer in wireless communication with said irrigation controller; and, irrigation control software executable by said computer and comprising:
a zone image selection interface configured to allow a user to assign each of a plurality of images to a corresponding zone from said plurality of irrigation zones;
an irrigation control interface configured to display one of said plurality of images in conjunction with at least one irrigation schedule modification control corresponding only to said corresponding zone.

8. The landscape controller system of claim 7, wherein each of said plurality of irrigation zones is associated with one of said images.

9. The landscape controller system of claim 8, wherein each of said images are configured to cause said irrigation control software to display at least one irrigation schedule modification control corresponding only to said corresponding zone.

10. The landscape controller system of claim 7, wherein said irrigation control software is further configured to obtain weather forecast data for a location of irrigation controller and modify an irrigation schedule.

11. The landscape controller system of claim 7, wherein said irrigation control software is further configured to control a schedule for lighting equipment within a landscape.

12. The landscape controller system of claim 8, wherein said irrigation control interface comprises a zone selection interface displaying each of said plurality of images adjacent to each other.

13. A landscape controller system comprising:
an irrigation controller controlling irrigation to a plurality of irrigation zones of an irrigation system;
a computer in wireless communication with said irrigation controller;
irrigation software disposed on a computer-readable medium and executable by said computer;
wherein said irrigation software is configured for user selectable association of images with said plurality of irrigation zones; and
wherein said irrigation software further comprises an image import interface for allowing a user to specify and association between said images and said plurality of irrigation zones.

14. The landscape controller of claim 13, wherein said irrigation software is configured to display one of said images in conjunction with at least one irrigation schedule modification controls corresponding only to a corresponding zone of said plurality of irrigation zones.

15. The landscape controller of claim 14, wherein said images are displayed as icons by said irrigation software.

16. The landscape controller of claim 15, wherein said images are displayed adjacent to each other by said irrigation software.

17. The landscape controller of claim 13, wherein said irrigation software is configured to email an irrigation schedule to a selectable email address.

18. The landscape controller of claim 17, wherein said irrigation software is configured to import an irrigation schedule emailed to said computer.

19. The landscape controller of claim 13, wherein said irrigation software is configured to modify an irrigation schedule based on weather forecast data downloaded to said computer.

* * * * *